Aug. 24, 1926.

R. J. CLARET 1,596,869

ELECTRIC HEATING ELEMENT

Filed May 7, 1925    2 Sheets-Sheet 1

Inventor
R.J. Claret
By his Attorney
Wm. H. Reid.

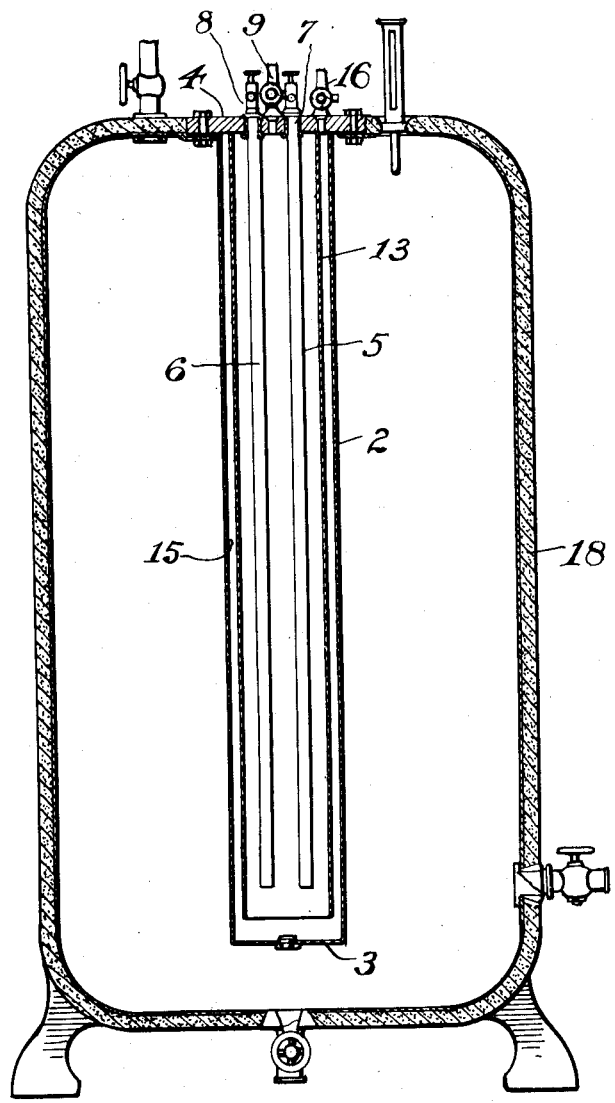

Patented Aug. 24, 1926.

1,596,869

UNITED STATES PATENT OFFICE.

ROGER J. CLARET, OF NEW YORK, N. Y.

ELECTRIC HEATING ELEMENT.

Application filed May 7, 1925. Serial No. 28,548.

This invention has reference to means for supplying heat to liquid or other places through the employment of an electric current.

The object of the invention is to provide a device wherein an electric current is caused to pass or flow between a pair of electrodes connected normally by a suitable fluid, in which device the fluid will be heated and at a suitable or predetermined temperature in the fluid and container, the pressure resulting from gas or vapor from the heated fluid will cause the same to pass below the electrodes and open their circuit; which will result in a lowering of the temperature and thereupon the condensation of the gas will cause the liquid to restore the circuit between the electrodes, and repeat the heating operation.

In the accompanying drawings showing one embodiment of my invention, Figure 1 is a vertical section through the heating element partly broken at the middle portion.

Fig. 3 is a view similar to Fig. 1 showing a container for the heating element.

Figure 1:
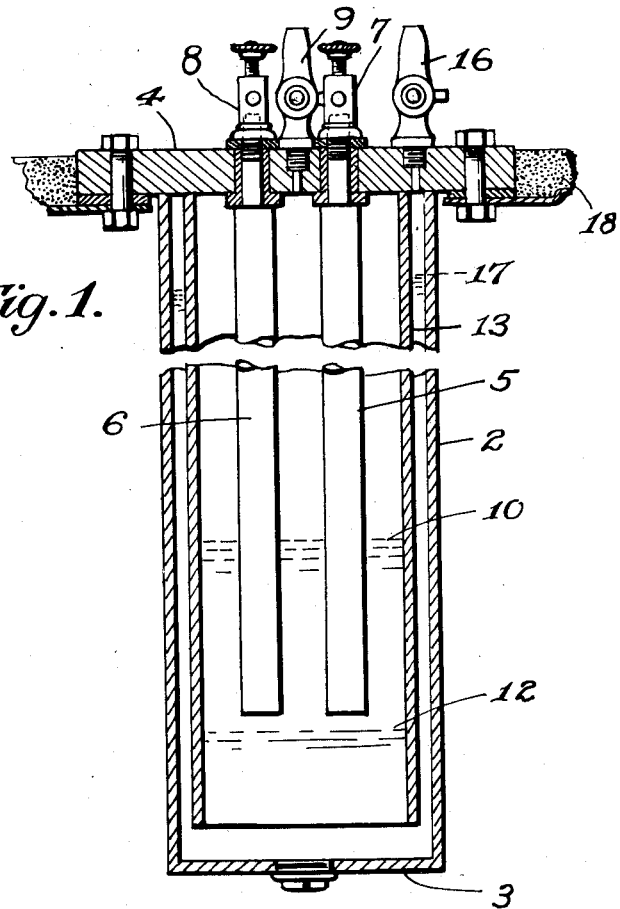
Figure 2:
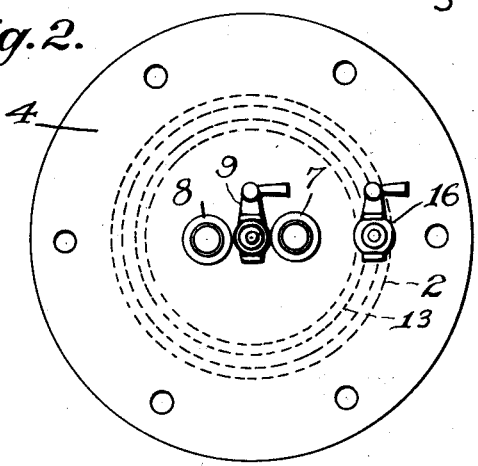
Fig. 2 is a plan view.

The apparatus as herein set forth for carrying out my invention comprises a vessel 2 shown as cylindrical with closed bottom 3, and a top 4 hermetically closing the vessel. A pair of electrodes 5 and 6 of suitable material are carried by insulating bushings 7 and 8 in the top 4. A suitable solution is placed in the vessel 2 that will convey the current between the electrodes that connect with a source of electric current, and which solution or liquid will serve to generate heat in the solution and in the vessel 2.

I also arrange a compartment that will connect with the lower portion of the vessel 2 below the electrodes. When the current flowing between the electrodes will generate sufficient heat the solution will produce gas or vapor, and the air being preferably exhausted previously from the vessel 2 through a stop cock 9, the gas under pressure above the solution will tend to force the solution into the said compartment, that will continue until the solution in the compartment, that was formerly at the level 10 will lower its level until it reaches a level at 12 below the lower ends of the two electrodes, and thus open their circuit. In the arrangement herein shown, a cylinder or tube 13 is placed in the vessel 2, being tightly secured to the top wall 4, with the lower end 14 of this cylinder open, and which end is located a considerable distance below the lower ends of the electrodes. This will provide a narrow annular compartment 15 between the outer wall of the vessel 2 and the cylinder 13, which compartment is closed at the top and open at the bottom to communicate with the cylindrical chamber inside of the tube 13, that contains the electrodes.

The said compartment 15 is provided with a stop cock 16, and when the solution is introduced through the stop cock 9, the contained air is removed from the compartment 15, and from the inner chamber containing the electrodes, so that the solution will rise to the same level 10 in the compartment and in the chamber, as indicated.

Upon the electric current being applied to the electrodes with the solution being supplied, and the vessel exhausted and the stop cocks closed, the current passing through the solution between the electrodes will at once heat the solution and the walls of the vessel 2. The gas or vapor generated will fill the space in the inner chamber above the solution, and the high pressure produced in the space above the solution around the electrodes being of much greater volume than the annular space above the solution in the narrow compartment 15, the solution will be forced downwardly in the inner chamber and upwardly in the compartment 15, which will lower the level of the solution, that will fall below the lower ends of the electrodes, as indicated by line 12. This will open the circuit between the electrodes, and heating effect will thereupon cease. This will obviously reduce the temperature, that will condense the vapor or gas above the solution in the inner chamber, so that the reduction of pressure will permit the solution to rise in the vessel and fall in the annular compartment. Thereby the electrodes become again immersed in the solution, and the circuit is thus automatically closed; heat will again result and the temperature will rise, with the same effect of generation of gas and pressure and subsequent opening of the circuit, in the manner described. This heating element may be placed in a suitable vessel 16 containing water or other liquid if desired and will impart its heat to such water; or any other means may be employed for utilizing the heat imparted to the vessel 2.

It will be understood that the compartments are so designed relatively and the proper proportion of solution employed whereby the operation will generate the proper degree of heat before the circuit is opened by lowering of the fluid liquid as described. Thereby the device will automatically regulate its operation, as soon as the desired temperature is reached the current is cut off, and then as soon as the temperature falls the circuit is restored and the heat continued.

Any suitable solution may be employed, but I have found that benzoate of soda in a solution of water, at about the ratio of 4 to 1 gives very satisfactory results.

It has been found by various trials that the casing 2 must be very strongly united with the top plate 4, and this is best accomplished by making them of iron or steel and welding the upper edge of the casing to the casing of the top plate. The inner tube 13 also is formed of steel, secured to the top plate in similar manner.

The solution that I have found to give excellent results is benzoate of soda, but of course other solutions may be employed. Such solution or liquid must be one that is non-electrolytic; but which term I include all substances that would not be decomposed by the current into its elements or compounds, or otherwise changed. Also the solution must not form a gas or vapor that would be conductive to the current between the electrodes. By the removal of the air and forming a vacuum, the vapor or gas is more readily produced, and the solution can rise in the annular chamber as depressed in the inner chamber around the electrodes. Of course, an inert gas might be introduced to displace the air, such as nitrogen.

What I claim is:

1. An electric heating element comprising a closed vessel, a pair of insulated electrodes projecting down into the vessel and terminating above its bottom, a compartment closed at the top and communicating with the said vessel below the lower ends of the electrodes, said two vessels having means to cause them to be closed under vacuum, and a heating solution placed in said vessel and partly filling said compartment to cause the electrodes to be normally partly immersed in the solution.

2. An electric heating element comprising a closed vessel, a pair of insulated electrodes projecting down into the vessel and terminating above its bottom, a cylinder located in said vessel secured to its top and projecting downwardly with its lower open end below the electrodes, whereby an annular compartment is provided around the chamber inside of the said cylinder containing the electrodes with its capacity smaller than that of said vessel containing the electrodes, and a heating solution placed in said vessel and partly filling said compartment to cause the electrodes to be normally partly immersed in the solution to close the circuit between the electrodes.

3. As an article of manufacture, an electric heating element comprising a closed vessel, a pair of insulated electrodes projecting down into the vessel and terminating above its bottom, a compartment closed at the top and communicating with the said vessel below the lower ends of the electrodes, and a heating solution placed in said vessel and said compartment to cause the electrodes to be normally partly immersed in the solution, the vessel and compartment being closed under vacuum.

4. As an article of manufacture, an electric heating element comprising a closed vessel, a pair of insulated electrodes projecting down into the vessel and terminating above its bottom, a cylinder in said vessel secured to its top whereby an annular compartment is provided around the chamber inside of the said cylinder containing the electrodes with its capacity smaller than that of said vessel containing the electrodes, and a heating solution placed in said vessel and said compartment to cause the electrodes to be normally partly immersed in the solution to close the circuit between the electrodes, the vessel and compartment being closed under vacuum.

5. An electric heating element comprising a closed vessel, a pair of insulated electrodes projecting down into the vessel and terminating above its bottom, a compartment closed at the top and communicating with the lower portion of said vessel, said two vessels being arranged to be hermetically closed under vacuum, and a heating solution of benzoate of soda placed in said vessel and partly filling said compartment, the electrodes being normally partly immersed in said solution to close the circuit between the electrodes, whereby the heat generated by the current passing between the electrodes will vaporize the liquid in the vessel above the electrodes and force the liquid level down in the vessel and upwardly in said compartment until the level in the vessel falling below the electrodes will open their circuit and cause fall of temperature to condense the vapor and thereby restore immersion of the electrodes to repeat such operation.

6. An electric heating element comprising a closed vessel, a pair of insulated electrodes projecting down into the vessel and terminating above its bottom, a cylinder located in said vessel secured to its top and projecting downwardly with its lower open end below the electrodes, whereby an annular compartment closed at the top is provided around the chamber inside of the said tube containing the electrodes, with its capacity considerably smaller than said vessel inside of the cylinder, and a heating solution of benzoate of soda placed in said vessel and partly filling said compartment, the electrodes being normally partly immersed in said solution to close the circuit between the electrodes, whereby the heat generated by the current passing between the electrodes will vaporize the liquid in the vessel under pressure and force the liquid level down in the vessel and upwardly in said compartment until the level in the vessel falling below the electrodes will open their circuit, and cause fall of temperature to condense the vapor and thereby restore immersion of the electrodes to repeat said operation.

Signed at New York city, N. Y., this 30 day of April, 1925.

ROGER J. CLARET.